United States Patent Office 2,729,673
Patented Jan. 3, 1956

2,729,673

CARBOXYLATION OF AROMATIC COMPOUNDS

William W. Prichard, Wilmington, Del., assignor to E. I. du Pont de Nemours and Company, Wilmington, Del., a corporation of Delaware No Drawing. Application November 30, 1951, Serial No. 259,309

7 Claims. (Cl. 260—515)

This invention relates to the carboxylation of aromatic compounds and, more particularly, to a new process for carboxylation of aromatic carbocyclic compounds having no substituents other than alkyl, alkoxy, carboxy, carbalkoxy, and carbonamido groups.

The known methods for preparing aromatic carboxylic acids having the carboxyl group directly attached to a carbon of the aromatic nucleus are uneconomical and rather unsatisfactory from the industrial standpoint. They involve in general oxidation of aromatic compounds having groups such as alkyl or aldehyde attached to the ring, with such reagents as chromic acid or potassium permanganate, or the hydrolysis of suitable aromatic nitriles or haloalkylaromatic compounds. These methods are expensive, not well adapted to continuous operation, and they require in general the use of corrosive reagents.

It has recently been proposed in U. S. Patent 2,565,463 to prepare aromatic carboxylic acids by carbonylation of aryl halides in the presence of an alkanoic acid and of a metal carbonyl catalyst. This method is quite satisfactory but it involves elimination of the halogen atom or atoms attached to the aromatic ring or, in other words, replacement of one substituent by another. Moreover, the patent indicates that the carboxylic acid is not obtained directly but only after hydrolysis of the intermediate carbonylation product. The disclosure of this patent could not therefore lead an investigator to believe that the carboxyl group could be introduced directly into an unsubstituted aromatic ring, nor could it possibly lead to the prediction that, if the aromatic ring bears halogen-free substituents, carboxylation to an aromatic acid would take place without removing or affecting the substituents.

An object of the present invention is to provide a new process for carboxylation of aromatic carbocyclic compounds having no substituents other than alkyl, alkoxy, carboxy, carbalkoxy, and carbonamido groups. A further object is to provide such a process whereby a carboxyl group is introduced directly into an unsubstituted aromatic ring or into an aromatic ring having only substituents as above mentioned without removing or affecting such substituents. Other objects will be apparent from the description of the invention given hereinafter.

The above objects are accomplished according to the present invention by reacting under substantially anhydrous conditions and at a temperature above 325° C., carbon monoxide, an alkanoic acid of 2 to 3 carbons, inclusive, i. e., acetic or propionic acid, or the anhydride thereof, and an aromatic carbocyclic compound having no substituents other than alkyl, alkoxy, carboxy, carbalkoxy, and carbonamido groups, the reaction being carried out in the presence of catalytic amounts of nickel carbonyl.

In a more specific form, the present invention comprises reacting under substantially anhydrous conditions and at a temperature of approximately 350° C. to 400° C. and under a carbon monoxide pressure of 200 to 1000 atmospheres, carbon monoxide, an alkanoic acid of 2 to 3 carbons, inclusive, and, per mole of alkanoic acid, from 1 to 10 moles of an aromatic carbocyclic compound as above, the reaction being carried out in intimate contact with catalytic amounts of nickel carbonyl.

It has now been unexpectedly found that aromatic carbocyclic compounds having no substituents other than those mentioned above can be carboxylated directly. The process of this invention involves an entirely new reaction whereby a hydrogen atom of the aromatic ring is replaced by the carboxyl, —COOH, group, without affecting or removing any substituents which may be present on the aromatic ring.

The mechanism of the reaction involved in this process is not known with certainty. It can be expressed, however, in terms of the end result by the following overall equation: $Ar \cdot H + R \cdot COOH \rightarrow Ar \cdot COOH + R \cdot H$ wherein the aromatic carboxylic acid is formed by attachment of the group of the alkanoic acid to the aromatic ring, together with the aliphatic hydrocarbon corresponding to the alkanoic acid, i. e., methane or ethane.

The following examples in which all proportions are by weight unless otherwise stated, illustrate specific embodiments of the invention.

*Example I*

A silver-lined pressure vessel having a volume equivalent to that of 400 parts of water, was charged with 160 parts of benzene, 25 parts of glacial acetic acid, and 5 parts of nickel carbonyl, and the vessel was cooled to 0° C. The vessel was pressured to 175 atmospheres with carbon monoxide and heated with agitation at 370° C. for ½ hour. The reaction product was distilled to remove the excess benzene and unreacted acetic acid. Fractionation of the residue at reduced pressure gave 11.4 parts of benzoic acid, corresponding to a conversion of 22.8% based on the acetic acid present in the reaction mixture.

*Example II*

The pressure vessel of Example I was charged with 138 parts of toluene, 15 parts of acetic acid, and 5 parts of nickel carbonyl. The vessel was cooled to 0° C., pressured with 100 atmospheres of carbon monoxide, then heated to 370° C. with agitation for 2 hours, after which the unreacted toluene and acetic acid were removed in a stripping still. Distillation of the residue at reduced pressure yielded 4.4 parts of a mixture of toluic acids, fractional crystallization of which indicated the presence of p-toluic acid as about 40% of the product. The remainder was a mixture of ortho-, meta-, and alpha-toluic acids. Conversion of acetic acid to toluic acid was 13%.

*Example III*

The pressure vessel of Example I was charged with 130 parts of naphthalene, 20 parts of acetic acid, and 2 parts of nickel carbonyl. The vessel was cooled to 0° C. and pressured with 150 atmospheres of carbon monoxide, then heated at 370° C. with agitation for 8 hours. The reaction product was extracted with 10% aqueous sodium hydroxide solution. Acidification of the extract caused precipitation of 3.7 parts of beta-naphthoic acid, corresponding to a conversion of 6.5% of the acetic acid present in the reaction mixture.

*Example IV*

The pressure vessel of Example I was charged with 150 parts of biphenyl, 20 parts of acetic acid, and 2 parts of nickel carbonyl. The vessel was pressured to 150 atmospheres with carbon monoxide at 0° C., then heated at 370° C. for 8 hours. The reaction mixture was extracted with 10% aqueous sodium hydroxide solution. Acidification of the extract caused precipitation of 5.3 parts of substantially pure meta-phenylbenzoic acid, corresponding to an 8% conversion.

Example V

The pressure vessel of Example I was charged with 100 parts of anthracene, 20 parts of acetic acid, and 2 parts of nickel carbonyl, and pressured to 150 atmospheres with carbon monoxide at 0° C. After heating with agitation at 370° C. for 2 hours, the reaction product was extracted with 10% aqueous sodium hydroxide solution. Acidification of the extract gave 0.3 part of a yellow solid which was identified as 9-anthroic acid by its melting point.

Example VI

The pressure vessel of Example I was charged with 150 parts of para-xylene, 20 parts of acetic acid, and 2 parts of nickel carbonyl, and pressured with carbon monoxide to 150 atmospheres at 0° C. The vessel was heated with agitation at 370° C. for 2 hours. Fractionation of the reaction product gave 1.7 parts of high boiling material which on extraction with 10% aqueous sodium hydroxide solution followed by acidification of the extract gave 2,5-dimethylbenzoic acid, identified by its melting point of 124–129° C.

Example VII

The pressure vessel of Example I was charged with 100 parts of benzene, 25 parts of acetic anhydride, and 5 parts of nickel carbonyl, and pressured with 100 atmospheres of carbon monoxide at 0° C. After heating at 370° C. with agitation for 2 hours, fractionation of the reaction product gave 2 parts of benzoic acid.

Example VIII

The pressure vessel of Example I was charged with 54 parts of propionic anhydride, 100 parts of benzene, and 10 parts of nickel carbonyl, and pressured with carbon monoxide at 100 atmospheres at 0° C. The vessel was heated at 325° C. with agitation for 2 hours. There was recovered 144 parts of reaction product which gave the following fractions on distillation:

(1) Boiling below 142° C. at 760 mm., 101.9 parts
(2) Boiling below 142° C. at 12 mm., 31.8 parts
(3) Boiling below 142° C. at 1 mm., 1.8 parts of solid
(4) Boiling below 186° C. at 0.1 mm., 2.4 parts of solid Fractions 3 and 4 consisted predominantly of benzoic acid.

Example IX

The pressure vessel of Example I was charged with 160 parts of benzene, 30 parts of propionic acid and 2 parts of nickel carbonyl and cold pressured with 150 atmospheres of carbon monoxide. After heating at 350° C. with agitation for 4 hours, the reaction product (175 parts) was distilled. Of this, 170 parts boiled below 140° C. at 25 mm. pressure. The residue gave 0.5 part of benzoic acid boiling at 140° C. at 1 mm. pressure.

Example X

The pressure vessel of Example I was charged with 160 parts of benzene, 15 parts of acetic acid, 10 parts of acetic anhydride, and 5 parts of nickel acetate containing 4 molecules of water of crystallization, and pressured at 0° C. with 150 atmospheres of carbon monoxide. The vessel was heated with agitation at 370° C. for 2 hours. Fractionation of the reaction product gave 13.5 parts of benzoic acid, obtained in 27% conversion.

The above-described experiment was substantially duplicated, except that the acetic anhydride was omitted, by heating at 370° C. for ½ hour a mixture of 160 parts of benzene, 25 parts of acetic acid, and 5 parts of nickel acetate containing 4 molecules of water of crystallization under an initial cold pressure of 150 atmospheres of carbon monoxide. This also gave benzoic acid as the reaction product but at a lower conversion of 6%.

Example XI

The pressure vessel of Example I was charged with 100 parts of benzoic acid, 20 parts of acetic acid and 2 parts of nickel carbonyl, and pressured with carbon monoxide at a cold pressure of 150 atmospheres. The vessel was heated with agitation at 370° C. for one half hour. There were recovered 60 parts of unreacted benzoic acid by distillation of the reaction product. Extraction of the distillation residue with 10% aqueous sodium hydroxide solution followed by filtration and acidification gave 3 parts of isophthalic acid. This represents a conversion of 5.4% based on the acetic acid in the reaction mixture.

Example XII

The pressure vessel of Example I was charged with 150 parts of methyl benzoate, 25 parts of acetic acid and 2 parts of nickel carbonyl and cold pressured with carbon monoxide at 150 atmospheres. After heating at 370° C. with agitation for one hour the reaction product (157 parts) was distilled. There was obtained 1.8 parts of methyl hydrogen isophthalate (the monomethyl ester of isophthalic acid) boiling at 200° C. at 1 mm. pressure. This product was further identified by its melting point and by saponification to isophthalic acid. The conversion was 2.5%, based on the acetic acid.

Example XIII

Example XII was repeated, except that the methyl benzoate was replaced by ethyl benzoate. There was obtained 3.5 parts (4.5% conversion) of the monoethyl ester of isophthalic acid.

Example XIV

The pressure vessel of Example I was charged with 150 parts of anisole, 25 parts of acetic acid and 2 parts of nickel carbonyl, cold pressured with carbon monoxide at 150 atmospheres and heated with agitation at 350° C. for 8 hours. The reaction product (173 parts) was extracted with excess 10% aqueous sodium hydroxide. On acidification and cooling of the extract, a solid precipitate (3 parts) was obtained. Fractional crystallization of this product permitted isolation of pure p-anisic acid,

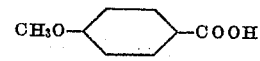

M. P. 182–184° C. The lower melting fractions were mixtures of o- and m-methoxybenzoic acids. The total conversion was 5% based on the acetic acid.

Example XV

The pressure vessel of Example I was charged with 15 parts of benzanilide, 25 parts of acetic acid, 3 parts of nickel carbonyl and 100 parts of benzene and pressured with carbon monoxide at 125 atmospheres. The vessel was heated with agitation at 360° C. for one hour, and the reaction product was distilled. After removal of the benzene, unchanged acetic acid and some benzoic acid, 7.9 parts of solid distillate was obtained by heating the residue to 250° C. under 1 mm. pressure. By triturating this solid with aqueous sodium carbonate and acidifying the extract there was obtained a small amount of acidic material which melted at 165° C. with immediate resolidification and remelting at 204° C. This was identified as o-carboxybenzanilide (the half anilide of phthalic acid),

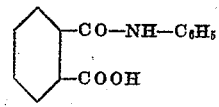

The alkali-insoluble portion of the solid distillate melted at 205–206° C. after recrystallization from a methanolchloroform mixture. It was identified as N-phenylphthalimide,

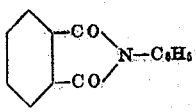

It is known that o-carboxybenzanilide dehydrates readily to N-phenylphthalimide by heating above its melting point. Thus, it is apparent that carboxylation of the benzanilide took place to give the free acid as an intermediate. The conversion was about 43% based on the benzanilide.

It will be understood that the above examples are merely illustrative and that the invention broadly comprises reacting carbon monoxide, acetic or propionic acid, and an aromatic carbocyclic compound having no substituents other than alkyl, alkoxy, carboxy, carbalkoxy, and carbonamido groups, in the presence of nickel carbonyl catalyst.

The process of this invention is generally applicable to the preparation of aromatic carboxylic acids from aromatic carbocyclic compounds which may be unsubstituted aromatic hydrocarbons or aromatic hydrocarbons having attached directly to annular carbon of an aromatic ring alkyl, alkoxy, carboxy, carbalkoxy or carbonamido groups. Additional examples of aromatic carbocyclic compounds suitable for carboxylation by this method include ethylbenzene, ortho-, meta- and para-diethylbenzene, propylbenzene, isopropylbenzene, diisopropylbenzene, t-butylbenzene, alpha- and beta-methylnaphthalene, phenanthrene, diphenylmethane, 4-phenyltoluene, phenetole, butyl phenyl ether, methyl naphthyl ether, ortho-, meta- and para-dimethoxybenzene, terephthalic acid, alpha- and beta-naphthoic acid, p-carboxydiphenyl, n-butyl benzoate, isopropyl naphthoate, methyl terephthalate, benzamide, N,N-dimethylbenzamide, N-butylbenzamide, alpha- and beta-naphthamide, N-phenyl-N-ethylbenzamide and the like. The preferred aromatic compounds, because of their accessibility and because they give better results in the process, are those having from 1 to 2 six-membered carbocyclic rings, unsubstituted or substituted by one or two groups which may be alkyl of 1 to 4 carbon atoms, inclusive, carboxyl, carbalkoxy of 1 to 5 carbon atoms, inclusive, or carbonamido of 1 to 9 carbon atoms, inclusive, wherein any group or groups attached to the amido nitrogen are alkyl of 1 to 4 carbon atoms, inclusive, or phenyl. The best results are obtained when the starting material is completely hydrocarbon, and the particularly preferred materials are the aromatic compounds containing 1 to 2 six-membered carbocyclic rings and being benzene and naphthalene and their mono- or dimethyl substitution products.

The relative proportions of the aromatic carbocyclic compound and of the alkanoic or anhydride are not critical. For example, there may be used as much as 10 moles of acid per mole of aromatic carbocyclic compound. In many cases, however, particularly when the aromatic compound is a hydrocarbon, it is preferable to use from 1 to 10 moles of it per mole of alkanoic acid or anhydride. Optimum results are generally attained when the aromatic compound and the alkanoic acid or anhydride are used in a molar ratio between 5:1 and 8:1. The excess of aromatic compound can serve as solvent or diluent medium for the reaction. If desired, however, there may be used, in addition to the desirable excess of aromatic compound, another solvent or diluent which may be any inert organic solvent stable under the reaction conditions. Suitable media are the saturated aliphatic or alicyclic hydrocarbons such as hexane, kerosene, cyclohexane, and the like.

The reaction should be carried out under substantially anhydrous conditions and it is preferred that all reactants, and any diluents if the latter are used, be anhydrous or substantially so. Only small amounts of water, e. g., about 1%–2% by weight of the total charge, can be normally tolerated.

The reaction is carried out in an atmosphere of carbon monoxide. In batch operations, it is conveniently carried out in pressure vessels with an added pressure of carbon monoxide. This pressure is not highly critical but it is desirably in the range of 200–1000 atmospheres at the operating temperature. The preferred pressure range at the operating temperature is between 350 and 600 atmospheres. This can, in general, be attained by charging the pressure vessel with a carbon monoxide pressure of 100–200 atmospheres at room temperature, as shown in the examples.

Nickel carbonyl, $Ni(CO)_4$, is a specific catalyst for this reaction. It can be introduced in the reaction mixture as preformed nickel carbonyl, or it can be formed in situ from metallic nickel and carbon monoxide or from nickel salts which form nickel carbonyl with carbon monoxide, such as nickel chloride, nickel bromide, nickel formate, nickel acetate, nickel oxalate, nickel aluminate, nickel silicate, and the like. The nickel carbonyl need be used only in small amounts, e. g., in amounts between 0.1% and 10% of the total weight of the reaction mixture, although much more can be used if desired, e. g., up to 25% by weight or even more. A generally useful amount of nickel carbonyl is between 0.5% and 5% of the reaction mixture by weight.

The reaction proceeds slowly at temperatures below about 325° C., and it is therefore preferred to operate above this temperature. The temperature can be as high as the decomposition point of the reactants, but in practice it need not be higher than about 450° C., a generally useful range being 350–400° C.

The reaction is very rapid at preferred temperatures, and in general it is substantially completed a few moments after the operating temperature has been reached. However, heating can be continued if desired for a period of a few minutes to a few hours in batch operation. The reaction product may be isolated by any desired method. In general, the excess aromatic compound and any diluent present are removed by distillation, together with any unreacted alkanoic acid, and the reaction product is then fractionated and/or recrystallized. The nickel carbonyl catalyst is not destroyed during the reaction and it is found in the low boiling fraction of the reaction product, i. e., the excess aromatic compound and the unreacted acetic or propionic acid. Thus, this fraction, which contains the catalyst, can be used again for another operation.

The reaction is well adapted to continuous operation. For this purpose, any suitable apparatus can be used, such as a long tubular reactor formed into a helix and cast in an aluminum block which can be heated to the desired temperature. The reactor is provided with suitable fittings and pumps to inject the aromatic compound, the aliphatic acid and the catalyst, separately or premixed, at a controlled rate, and with fittings to maintain the desired carbon monoxide pressure. A take-off is provided at the end of the reaction zone, by means of which the total pressure can be controlled, and an auxiliary stripping still separates the unreacted aromatic compound and aliphatic acid, together with the catalyst, for recirculation through the reactor.

Since the reaction is carried out at high temperatures under carbon monoxide pressure, the use of liner materials which are reactive with carbon monoxide under such conditions should be avoided. Satisfactory materials of construction for the liners of the reaction vessels are, for example, silver, Monel metal, brass, porcelain, copper and "Hastelloy C" (a nickel-iron-molybdenum alloy).

This invention provides a simple and effective method of preparing aromatic carboxylic acids from readily available and cheap starting materials. As is known, these products are of considerable technical importance in themselves and as intermediates in the synthesis of many industrial products such as dyes or pharmaceuticals.

As many apparently widely different embodiments of this invention may be made without departing from the spirit and scope thereof, it is to be understood that the invention is not limited to the specific embodiments thereof except as defined in the appended claims.

The invention claimed is:

1. Process for carboxylation of aromatic carbocyclic compounds which comprises reacting in the presence of catalytic amounts of nickel carbonyl under substantially anhydrous conditions at a temperature up to about 450° and above 325° C. in an atmosphere of carbon monoxide, an alkanoic acid of 2 to 3 carbons, inclusive, and an aromatic carbocyclic compound selected from the group consisting of unsubstituted aromatic hydrocarbons and alkyl-, alkoxy-, carboxy-, carbalkoxy-, and carbonamido-substituted aromatic hydrocarbons having at most one substituent other than alkyl, said substituent being attached directly to annular carbon of an aromatic ring.

2. Process as set forth in claim 1 wherein said alkanoic acid is reacted with, per mole of alkanoic acid, 1 to 10 moles of said aromatic carbocyclic compound.

3. Process as set forth in claim 2 wherein said reaction is carried out at a temperature of about 350° C. to 400° C.

4. Process as set forth in claim 3 wherein said reaction is carried out under a carbon monoxide pressure of 350 to 600 atmospheres.

5. Process for carboxylation of aromatic carbocyclic compounds which comprises reacting under substantially anhydrous conditions at a temperature up to about 450° and above 325° C. in an atmosphere of carbon monoxide, an alkanoic acid of 2 to 3 carbons, inclusive, and, per mole of alkanoic acid, 5 to 8 moles of an aromatic compound containing 1 to 2 six-membered carbocyclic rings having no substituents other than at the most two methyl groups, said reaction being carried out in the presence of catalytic amounts of nickel carbonyl.

6. Process as set forth in claim 5 wherein said reaction is carried out at a temperature of about 350° C. to 400° C.

7. Process as set forth in claim 6 wherein said reaction is carried out under a carbon monoxide pressure of 350 to 600 atmospheres.

References Cited in the file of this patent

UNITED STATES PATENTS

| | | |
|---|---|---|
| 1,776,154 | Knorr | Sept. 16, 1930 |
| 1,909,833 | Johannsen | May 16, 1933 |
| 1,939,005 | Guthke | Dec. 12, 1934 |

FOREIGN PATENTS

| | | |
|---|---|---|
| 537,610 | Germany | Nov. 6, 1931 |

OTHER REFERENCES

Dewar et al.: J. Chem. Soc. (London) vol. 85, p. 213 (1904.)

Homer: J. Chem. Soc. (London) vol. 91, p. 1104 (1907.)

Reppe: "Acetylene Chemistry" P. B. Report—18852-S, pp. 163–170, 188 (1949.)